3,278,553
CONCURRENT PREPARATION OF HYDROGEN
HALIDE AND TETRAHALOTHIOPHENE
Edward D. Weil, Lewiston, N.Y., assignor to Hooker
Chemical Corporation, Niagara Falls, N.Y., a corporation of New York
No Drawing. Filed May 1, 1963, Ser. No. 277,103
9 Claims. (Cl. 260—332.5)

This invention relates to a process for the concurrent preparation of hydrogen halide and tetrahalothiophene. More specifically, the present invention is concerned with the concurrent production of tetrachlorothiophene and hydrogen choloride.

Tetrachlorothiophene and other halothiophenes are known to have pesticidal properties. They are useful, for instances, as nematocides, fungicides, insecticides, and germicides.

Processes for the preparation of tetrachlorothiophene from thiophene often involve disadvantages, such as, the relatively high cost of thiophene of purity adequate for the reactions and the poor yields generally obtained. Recently, it has been discovered that tetrachlorothiophene can also be prepared by reacting sulfur with hexachlorobutadiene. However, hexachlorobutadiene, although available as a cheap by-product on a small commercial scale, is not readily available on a large commercial scale, and processes for manufacturing it require costly equipment. Furthermore, the sulfur monochloride produced as a by-product in said process is contaminated with organic impurities and must be subjected to a costly purification step before it is of commercial quality. Even in pure form, sulfur monochloride sells for a low price and thus, in most instances, is a troublesome by-product to dispose of.

The process of the present invention comprises reacting sulfur with a normal butane derivative of the formula:

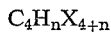

wherein $n$ is an integer from 1 to 3, inclusive, and X is a halogen such as chlorine or bromine. The preferred halogen is chlorine. The reaction can best be described by the following equation:

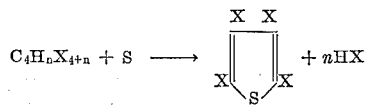

It is important to the invention that the reaction be accomplished in the liquid phase.

The term "normal-butane derivative" is used herein to mean a straight chain halohydrocarbon of four carbon atoms, although not necessarily actually manufactured from normal-butane.

Illustrative examples of normal-butane derivatives utilized as a reactant in the process of the present invention include, e.g., pentachlorobutadienes, pentabromobutadienes, hexachloro-n-butenes, hexabromo-n-butenes, heptachloro-n-butanes, heptabromo-n-butanes, and mixtures thereof. Further any chlorine or bromine position isomers of these or mixtures of isomers can be employed.

Suitable chloronormal-butane derivative starting materials include the mixed heptachloro-n-butanes obtainable by chlorination of n-butane or of lower chlorinated n-butanes or butenes, e.g., by the processes of Rosenberg, United States Patent No. 2,899,370; McBee, United States Patents No. 2,473,161–2; Prins, Rec. Trav. Chim., 56, 124 (1937), and others. Also suitable are trichloroethylene dimerization products, e.g., hexachlorobutenes, such as are produced by the processes of British Patent No. 517,213; German Patent Nos. 718,057, 721,380; French Patent Nos. 841,728, 814,423, and 840,867; Haszeldine and Osborne, J. Chem. Soc. 3885 (1955); Henne et al., J. Am. Chem. Soc. 69, 279; Frank and Blackham, J. Am. Chem. Soc. 72, 3283; Inamato, Chem. Abstracts 50, 159; and other processes of related sorts; also the pentachlorobutadienes such as are produced by the procedures of Roedig and Kloss, Annalen der Chemie, 612, 1 (1958), Gonikberg and Zhulin, Bull. Acad. Sci. USSR, 882 (1959), and the like.

The molar ratio of sulfur and halogenated butane derivative will generally and preferably be in the vicinity of 1:1, although the process of the invention is workable with an excess of one or the other reactant. It is preferable for maximum yield that all of the sulfur be in solution at the reaction temperature; to this object, stirring and gradual addition of the sulfur are preferably employed.

The process of the invention is conducted in the temperature range between about 150 degrees centigrade and about 300 degrees centigrade. The preferred temperature range is between about 170 degrees centigrade and 270 degrees centigrade. It is especially convenient to allow the reaction mixture to reflux, thus maintaining the temperature at whatever happens to be the reflux temperature of a mixture containing from 100 to 0 percent of starting material, and from 0 to 100 percent of tetrahalothiophene, this refluxing temperature being somewhat lowered by the continued evolution of hydrogen halide. The reaction may be conveniently run at or near atmospheric pressure, but lower pressures may be advantageous where it is desired to employ temperatures below the atmospheric boiling point of the reaction mixture, and higher pressures may be indicated when it is desired to employ higher temperatures than the atmospheric boiling point.

The reaction time will normally be from about 0.1 hour to 100 hours, the shorter time being appropriate at the higher end of the indicated temperature range, the longer time at the lower end of the temperature range. It is convenient to follow the reaction by hydrogen chloride evolution; thus, the reaction time can be stated to be that which is observed to yield a major fraction of the theoretical amount of HCl produced according to the equation given above.

The hydrogen chloride which is produced in a preferred embodiment of the present invention may be collected in water to form muriatic acid or may be purified if desired, by chilling, scrubbing, low temperature condensation-distillation, or other means, to produce anhydrous hydrogen chloride suitable for vinyl chloride manufacture and other commercial purposes.

The tetrahalothiophene produced may be employed directly as the crude reaction product, or may be purified by distillation, crystallization, sublimation, or the like, if desired.

The process of the invention is also applicable where some or all of the halogen atoms in the starting material are bromine rather than chlorine; where all of the atoms are bromine, the products are tetrabromothiophene and hydrogen bromide. Where the halogen atoms of the starting material are both chlorine and bromine, mixed tetrahalothiophenes and hydrogen halides are obtained.

The teachings and findings of this invention may be more fully understood by considering the following examples which are set forth only with the intention of illustrating the invention and not in any way limiting it. All temperatures are in degrees centigrade, and all parts are by weight unless otherwise indicated.

*Example 1*

Trichloroethylene was dimerized substantially as described in Example 1 of British Patent No. 517,213, and the dimer (hexachlorobutene) was purified by distillation.

A mixture of 75 parts of this hexachlorobutene and 8.96 parts of powdered sulfur was heated to boiling (208 to 210 degrees centigrade), in a vessel fitted with a reflux condenser, the outlet of which was connected to a water-filled trap for collection of hydrogen chloride. In 28 hours, 97 percent of the theoretical two moles of hydrogen chloride per mole of hexachlorobutene, was collected. The reaction mixture remaining in the reactor was then distilled to collect 49 parts of tetrachlorothiophene, boiling point 100 to 135 degrees centigrade at 16 to 20 millimeters of mercury pressure, identified by infrared spectrum.

*Example 2*

Butylene dichloride was photochlorinated at 25 to 100 degrees centigrade with chlorine to produce a crude heptachloro-n-butane.

A mixture of 50 parts of this heptachloro-n-butane and 5 parts of sulfur was heated under reflux at 190 to 230 degrees centigrade over 72 hours, by which time 3 molar equivalents of hydrogen chloride were collected in a water-filled trap. The reaction mixture was then fractionally distilled to obtain 12 parts of tetrachlorothiophene of better than 95 percent purity (by gas chromatographic analysis).

*Example 3*

A mixture of 46 parts of pentachlorobutadiene (made by the method of Roedig and Kloss, Annalen der Chemie, 612, 1 (1958)), and 6 parts of sulfur was refluxed and stirred at about 205 degrees centigrade for 8 hours. One molar equivalent of hydrogen chloride was collected during this time. The product was then distilled to obtain tetrachlorothiophene in a practical state of purity. The tetrachlorothiophene upon redistillation had a freezing point of 29 degrees centigrade.

The above examples may be repeated wherein all the halogen atoms on the starting reagent are bromine, or chloride and bromine. Where all the atoms are bromine, the products are tetrabromothiophene and hydrogen bromide, while mixed tetrahalothiophenes and hydrogen halides are obtained when the halogen atom on the starting reagent is chlorine and bromine.

It is to be understood that the invention is not limited to the specific examples which have been offered merely as illustrative, and that modifications may be made within the scope of the appended claims without departing from the spirit of the invention.

What is claimed is:

1. A process for the preparation of tetrahalothiophene which comprises reacting sulfur with a compound of the formula:

$$C_4H_nX_{4+n}$$

in the liquid phase and at a temperature of from about 150 degrees centigrade to about 300 degrees centigrade, wherein $n$ is an integer from 1 to 3, inclusive, and X is a halogen atom selected from the group consisting of chlorine and bromine.

2. A process for the concurrent preparation of hydrogen halide and tetrahalothiophene which comprises reacting sulfur with a compound of the formula:

$$C_4H_nX_{4+n}$$

in the liquid phase and at a temperature of from about 150 degrees centigrade to about 300 degrees centigrade, wherein $n$ is an integer from 1 to 3, inclusive, and X is a halogen atom selected from the group consisting of chlorine and bromine.

3. A process for the concurrent preparation of hydrogen halide and tetrahalothiophene which comprises reacting together in the liquid phase and at a temperature of from about 150 degrees centigrade to about 300 degrees centigrade, sulfur and a n-butane derivative of the formula:

$$C_4H_nX_{4+n}$$

wherein $n$ is an integer from 1 to 3, inclusive, and X is a halogen atom selected from the group consisting of chlorine and bromine.

4. A process for the concurrent preparation of hydrogen chloride and tetrachlorothiophene which comprises reacting together in the liquid phase and at a temperature of from about 150 degrees centigrade to about 300 degrees centigrade, sulfur and a compound of the formula:

$$C_4H_nCl_{4+n}$$

wherein $n$ is an integer from 1 to 3, inclusive.

5. The process in accordance with claim 4 wherein hexachlorobutene is employed.

6. The process in accordance with claim 4 wherein pentachlorobutadiene is employed.

7. The process in accordance with claim 4 wherein heptachlorobutane is employed.

8. The process in accordance with claim 1 wherein $n$ is 1.

9. The process in accordance with claim 8 wherein the molar ratio of sulfur to the compound of the formula $C_4H_nX_{4+n}$ is 1:1 and the reaction is accomplished for a period of about 0.1 hour to 100 hours thereby resulting in tetrahalothiophene of high yield and high purity, wherein X is selected from the group consisting of chlorine and bromine.

References Cited by the Examiner

UNITED STATES PATENTS

| | | | |
|---|---|---|---|
| 2,410,401 | 10/1946 | Coffman | 260—329 |
| 2,900,394 | 8/1959 | Geering | 260—332.5 |
| 2,932,651 | 4/1960 | Ilgenfritz et al. | 260—332.5 |

WALTER A. MODANCE, *Primary Examiner.*

JAMES A. PATTEN, *Assistant Examiner.*